(12) United States Patent
Matsui (10) Patent No.: US 11,209,547 B2
(45) Date of Patent: Dec. 28, 2021

(54) AXIAL DEVIATION DETECTION DEVICE AND VEHICLE

(71) Applicant: Toyota Jidosha Kabushiki Kaisha, Toyota (JP)

(72) Inventor: Toshiki Matsui, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 16/422,205

(22) Filed: May 24, 2019

(65) Prior Publication Data

US 2020/0041650 A1 Feb. 6, 2020

(30) Foreign Application Priority Data

Aug. 1, 2018 (JP) .............................. JP2018-145318

(51) Int. Cl.
*G01S 17/89* (2020.01)
*G01S 17/931* (2020.01)
(Continued)

(52) U.S. Cl.
CPC .............. *G01S 17/89* (2013.01); *B60W 40/04* (2013.01); *B60W 40/076* (2013.01);
(Continued)

(58) Field of Classification Search
CPC ..... B60W 2050/0005; B60W 2420/52; B60W 40/04; B60W 40/076; G01S 17/10;
(Continued)

(56) References Cited

U.S. PATENT DOCUMENTS

2018/0364717 A1* 12/2018 Douillard ........... G06K 9/00791

FOREIGN PATENT DOCUMENTS

| JP | 2004-205398 A | 7/2004 |
|---|---|---|
| JP | 2016-080539 A | 5/2016 |

OTHER PUBLICATIONS

Britt, Jordan. Lane Detection, Calibration, and Attitude Determination with a Multi-Layer Lidar for Vehicle Safety Systems. Diss. 2010. (Year: 2010).*

(Continued)

*Primary Examiner* — Kenny A Cese
(74) *Attorney, Agent, or Firm* — Dinsmore & Shohl LLP (57) ABSTRACT

An axial deviation detection device configured to detect axial deviation of a LIDAR system mounted on a vehicle is provided. The axial deviation detection device includes a storage device and a processor. The storage device stores reference plane information indicating a position of a reference plane, and LIDAR measurement information indicating positions of point clouds detected by the LIDAR system in a sensor coordinate system. The processor is configured to extract a road surface point cloud representing a road surface from the point clouds indicated in the LIDAR measurement information, approximate the road surface point cloud by an approximation plane and acquire the approximation plane as an estimated road plane, compare the estimated road plane with the reference plane indicated by the reference plane information, and determine that the axial deviation occurs when a deviation between the estimated road plane and the reference plane is larger than a threshold.

4 Claims, 10 Drawing Sheets

(51) Int. Cl.
*B60W 40/076* (2012.01)
*B60W 40/04* (2006.01)
*B60W 50/00* (2006.01)
*G06K 9/00* (2006.01)

(52) U.S. Cl.
CPC .... *G01S 17/931* (2020.01); *B60W 2050/0005* (2013.01); *B60W 2420/52* (2013.01); *G06K 9/00791* (2013.01); *G06T 2207/10028* (2013.01); *G06T 2207/30252* (2013.01)

(58) Field of Classification Search
CPC ...... G01S 17/89; G01S 17/931; G01S 7/4817; G01S 7/4972; G06T 2207/30252; G06T 2207/10028; G06K 9/00791
See application file for complete search history.

(56) References Cited

OTHER PUBLICATIONS

Britt et al., "Lane Detection, Calibration, and Attitude Determination with a Multi-Layer Lidar for Vehicle Safety Systems" (Year: 2010).*

* cited by examiner

AXIAL DEVIATION DETECTION DEVICE AND VEHICLE

CROSS REFERENCE TO RELATED APPLICATION

This application claims priority to Japanese Patent Application No. 2018-145318 filed on Aug. 1, 2018, incorporated herein by reference in its entirety.

BACKGROUND

1. Technical Field

The present disclosure relates to a technology that allows detection of an axial deviation of a laser imaging detection and ranging, LIDAR, system mounted on a vehicle.

2. Description of Related Art

Japanese Patent Application Publication No. 2004-205398 (JP 2004-205398 A) describes a method of adjusting a radar optical axis of a radar device for vehicles. According to the method, a reference vanishing point is detected based on an image taken by a camera while the vehicle is traveling. An emitting direction of a laser beam from the radar device is also detected. Subsequently, a difference between the reference vanishing point and the emitting direction of the laser beam is detected, and the emitting direction of the laser beam is corrected to eliminate the difference.

Japanese Patent Application Publication No. 2016-80539 (JP 2016-80539 A) describes an on-vehicle sensor in which a camera and a LIDAR system are assembled together. In the case where an axial deviation of the on-vehicle sensor occurs, an object detection region of the LIDAR system is set appropriately in consideration of the axial deviation. More specifically, first, an axial deviation amount of the camera is calculated. Subsequently, the object detection region of the LIDAR system is set appropriately based on the axial deviation amount of the camera.

SUMMARY

A LIDAR system mounted on a vehicle is used to identify objects around the vehicle. An "axial deviation" of the LIDAR system refers to the state in which a posture of the LIDAR system changes from its initial state (reference state). The axial deviation of the LIDAR system reduces accuracy in identifying objects. Thus, it is desired that the axial deviation of the LIDAR system is detected.

In the related art described in JP 2004-205398 A, a plurality of types of sensors is required to detect the axial deviation. In addition, only a relative axial deviation between each type of sensor can be detected.

The present disclosure provides a technology that allows detection of the axial deviation of the LIDAR system without using a plurality of types of sensors.

The first aspect provides an axial deviation detection device configured to detect the axial deviation of a laser imaging detection and ranging, LIDAR, system mounted on a vehicle. The axial deviation detection device includes a storage device and a processor. The storage device stores reference plane information indicating a position of a reference plane, and LIDAR measurement information indicating positions of point clouds detected by the LIDAR system in a sensor coordinate system. The sensor coordinate system is a varied coordinate system in which the coordinate system varies in accordance with the axial deviation of the LIDAR system. The reference plane corresponds to a plane represented in the sensor coordinate system in a state in which the axial deviation of the LIDAR system does not occur and the vehicle is located on the plane. The processor is configured to extract a road surface point cloud representing a road surface from the point clouds indicated in the LIDAR measurement information, approximate the road surface point cloud by an approximation plane and acquire the approximation plane as an estimated road plane, compare the estimated road plane with the reference plane indicated by the reference plane information, and determine that the axial deviation occurs in the case where a deviation between the estimated road plane and the reference plane is larger than a threshold.

The second aspect may further include the following features. The processor is configured to reserve determination on whether the axial deviation occurs in the case where a low reliability condition indicating that reliability of the estimated road plane is low is met.

The third aspect may further include the following features. A low reliability condition is that a residual between the road surface point cloud and the estimated road plane is larger than a first threshold.

The fourth aspect may further include the following features. A low reliability condition is that a variation of a normal vector to the estimated road plane within a certain period is larger than a second threshold.

The fifth aspect provides an axial deviation detection device configured to detect axial deviation of a laser imaging detection and ranging, LIDAR, system mounted on a vehicle. The axial deviation detection device includes a storage device and a processor. The storage device stores reference plane information indicating a position of a reference plane, and LIDAR measurement information indicating positions of point clouds detected by the LIDAR system in a sensor coordinate system. The sensor coordinate system is a varied coordinate system in which the coordinate system varies in accordance with the axial deviation of the LIDAR system. The reference plane corresponds to a plane represented in the sensor coordinate system in a state in which the axial deviation of the LIDAR system does not occur and the vehicle is located on the plane. The processor is configured to extract a road surface point cloud representing a road surface from the point clouds indicated in the LIDAR measurement information, calculate a residual between the road surface point cloud and the reference plane indicated in the reference plane information, search for a variation amount of the sensor coordinate system having a smallest residual, and determine that the axial deviation occurs in the case where the variation amount of the sensor coordinate system having the smallest residual is larger than a threshold.

The sixth aspect may further include the following features. The processor is configured to reserve determination on whether the axial deviation occurs in the case where the smallest residual is larger than a third threshold.

The seventh aspect provides a vehicle. The vehicle includes a laser imaging detection and ranging, LIDAR, system, a storage device, and a processor. The storage device stores reference plane information indicating a position of a reference plane, and LIDAR measurement information indicating positions of point clouds detected by the LIDAR system in a sensor coordinate system. The sensor coordinate system is a varied coordinate system that varies in accordance with the axial deviation of the LIDAR system. The reference plane corresponds to a plane represented in the sensor coordinate system in a state in which the axial deviation of the LIDAR system does not occur and the vehicle is located on the plane. The processor is configured to extract a road surface point cloud representing a road surface from the point clouds indicated in the LIDAR measurement information, approximate the road surface point cloud by an approximation plane and acquire the approximation plane as an estimated road plane, compare the estimated road plane with the reference plane indicated by the reference plane information, and determine that the axial deviation occurs in the case where a deviation between the estimated road plane and the reference plane is larger than a threshold.

The eighth aspect includes a vehicle. The vehicle includes a laser imaging detection and ranging, LIDAR, system, a storage device, and a processor. The storage device stores reference plane information indicating a position of a reference plane, and LIDAR measurement information indicating positions of point clouds detected by the LIDAR system in a sensor coordinate system. The sensor coordinate system is a varied coordinate system that varies in accordance with the axial deviation of the LIDAR system. The reference plane corresponds to a plane represented in the sensor coordinate system in a state in which the axial deviation of the LIDAR system does not occur and the vehicle is located on the plane. The processor is configured to extract a road surface point cloud representing a road surface from the point clouds indicated in the LIDAR measurement information, calculate a residual between the road surface point cloud and the reference plane indicated in the reference plane information, search for a variation amount of the sensor coordinate system having a smallest residual, and determine that the axial deviation occurs in the case where the variation amount of the sensor coordinate system having the smallest residual is larger than a threshold.

According to the first aspect, the estimated road plane is acquired from the road surface point clouds detected by the LIDAR system. The acquired estimated road plane is compared with the reference plane in the reference state, in which the axial deviation of the LIDAR system does not occur. In the case where the deviation between the estimated road plane and the reference plane is larger than the threshold, it is determined that the axial deviation of the LIDAR system occurs.

Thus, the axial deviation of the LIDAR system can be detected based on the measurement results from the LIDAR system. There is no need to use a plurality of types of sensors to detect the axial deviation. In addition, this enables detection of an absolute axial deviation of the LIDAR system, rather than a relative axial deviation between each type of sensor. Furthermore, neither special devices nor special facilities are required to detect the axial deviation of the LIDAR system. The axial deviation of the LIDAR system can be detected easily and quickly while the vehicle is actually in use.

According to the second aspect, the reliability of the estimated road plane is taken into account in the axial deviation determination processing. In the case where the reliability of the estimated road plane is low, the determination on whether the axial deviation of the LIDAR system occurs is reserved. Thus, a constant level of accuracy in the axial deviation determination processing is secured.

The method according to the third aspect is equivalent to the method according to the first aspect. According to the third aspect, an effect similar to that according to the first aspect can be obtained.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION

Embodiments of the present disclosure will be described below with reference to the accompanying drawings.

1. First Embodiment 1-1. Outline

Figure 1:
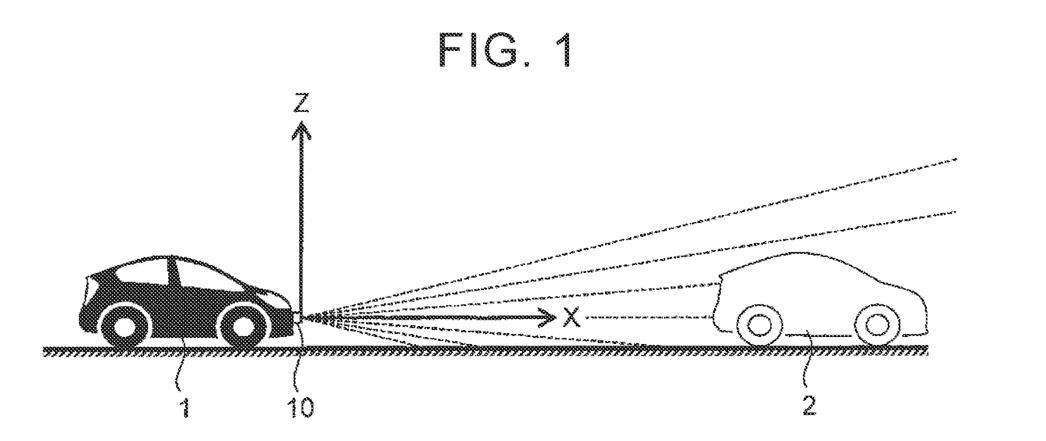
FIG. 1 is a schematic diagram for describing a LIDAR system mounted on a vehicle according to a first embodiment of the present disclosure.

FIG. 1 is a schematic diagram for describing a laser imaging detection and ranging (LIDAR) system 10 according to a first embodiment of the present disclosure. The LIDAR system 10 is mounted on a vehicle 1 and is used to identify objects around the vehicle 1.

The LIDAR system 10 is a remote sensing device that measures relative positions (distances and directions) of objects using laser pulses. More specifically, the LIDAR system 10 outputs laser pulses (for scanning) sequentially towards a plurality of directions. When the laser pulses reflect on a reflection point of the object, the reflected light of the laser pulses returns to the LIDAR system 10. The LIDAR system 10 receives the reflected light of the laser pulses. Then, the LIDAR system 10 can calculate the distance and the direction of the reflection point from a state of the received reflected light. A point cloud is a group of reflection points detected by the LIDAR system 10.

A coordinate system used in the embodiment will be described herein. In the embodiment, a "sensor coordinate system" fixed to the LIDAR system 10 is used. An X axis, a Y axis, and a Z axis intersecting each other represent the sensor coordinate system. For example, the X axis is a central axis used for scanning and is parallel to the horizontal direction in its initial state. The Y axis is parallel to a horizontal scanning plane. The Z axis is parallel to a perpendicular scanning plane.

The LIDAR system 10 acquires positional information of the point cloud. The positional information of the point cloud represents the position (distance and direction) of each reflection point in the sensor coordinate system. Objects around the vehicle 1 can be identified based on the positional information of the point cloud. For example, as illustrated in FIG. 1, a preceding vehicle 2 located in front of the vehicle 1 can be identified based on the positional information of the point cloud.

Next, an "axial deviation" of the LIDAR system 10 will be described with reference to FIG. 2. The axial deviation of the LIDAR system 10 refers to the state in which a posture of the LIDAR system 10 changes from its initial state. Such an axial deviation (change in posture) may occur by change over time and by contact of the LIDAR system 10 with objects, for example. As described above, the sensor coordinate system is a coordinate system that is fixed to the LIDAR system 10. Thus, the sensor coordinate system changes in accordance with the change in the posture of the LIDAR system 10. That is, the sensor coordinate system is a varied coordinate system in which the coordinate system varies in accordance with the axial deviation of the LIDAR system 10.

In the case where the axial deviation of the LIDAR system 10 occurs, the sensor coordinate system is varied from its initial state. As a result, an "apparent position" of an object in the sensor coordinate system is deviated from the actual position of the object. This reduces accuracy in identifying objects.

Figure 2:
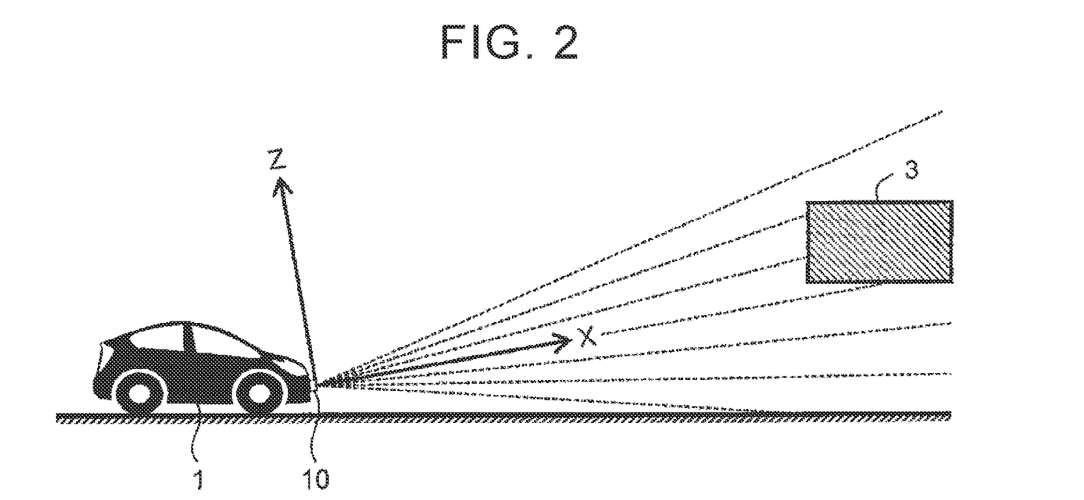
FIG. 2 is a schematic diagram for describing an axial deviation of the LIDAR system according to the first embodiment of the present disclosure.

For example, in FIG. 2, an upper structure 3 is located higher than the vehicle 1. Examples of the upper structure 3 include signs, signboards, elevated structures, and overbridges. A case in which the X axis and the Z axis are varied from their initial states due to the axial deviation in pitch direction is considered herein. In this case, in the sensor coordinate system, the upper structure 3 appears to be located in the X axis direction. That is, even in the case where the upper structure 3 is actually located higher than the vehicle 1, it is incorrectly identified that the upper structure 3 is located at the same height as the vehicle 1. Such incorrect identifications are not preferable because they may reduce the accuracy in vehicle travel control executed based on identification results.

In this view, the embodiment provides a technology that allows detection of the axial deviation of the LIDAR system 10.

First, a "reference state" and a "reference plane REF" according to the embodiment will be described with reference to FIG. 3. The reference state refers to a state in which no axial deviation of the LIDAR system 10 occurs. That is, the reference state is equivalent to the initial state in which the LIDAR system 10 is mounted on the vehicle 1. In the reference state, the vehicle 1 is located on a certain plane. The reference plane REF refers to the relevant plane represented in the sensor coordinate system in the reference state. The reference plane REF may also be referred to as an "expected road plane," which is the plane expected to be detected by the LIDAR system 10 in the case where the axial deviation does not occur.

Figure 4:
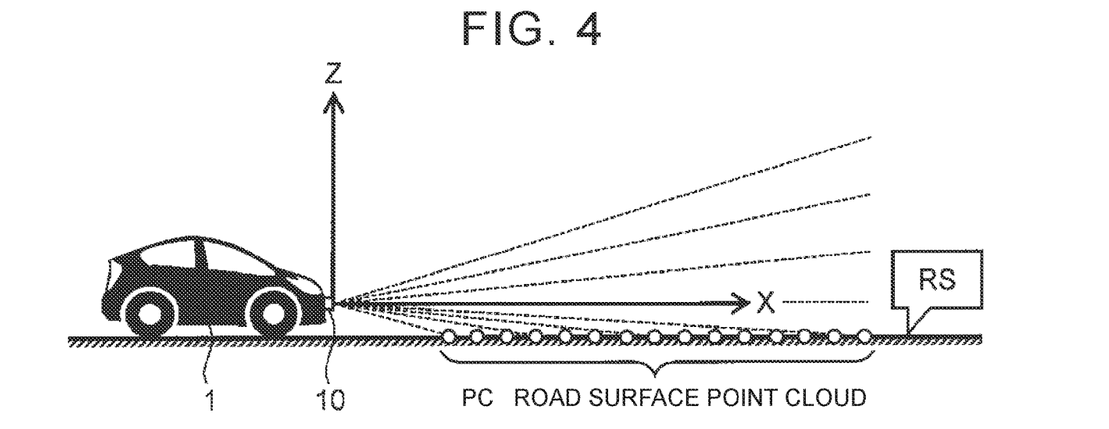
FIG. 4 is a schematic diagram for describing a road surface point cloud according to the first embodiment of the present disclosure.

Next, a "road surface point cloud PC" according to the embodiment will be described with reference to FIG. 4. FIG. 4 illustrates a state in which the vehicle 1 is actually in use. The vehicle 1 is located on a flat road surface RS. The laser pulses output from the LIDAR system 10 are reflected by minute bumps formed on the road surface RS. Thus, the LIDAR system 10 can also detect the road surface RS. The road surface point cloud PC is a point cloud representing the road surface RS among the point clouds detected by the LIDAR system 10.

Next, an "estimated road plane ERP" according to the embodiment will be described with reference to FIG. 5. The road surface point cloud PC described above may be approximated to a plane. The estimated road plane ERP is an approximation plane approximating the road surface point cloud PC. The estimated road plane ERP is also represented in the sensor coordinate system.

Figure 3:
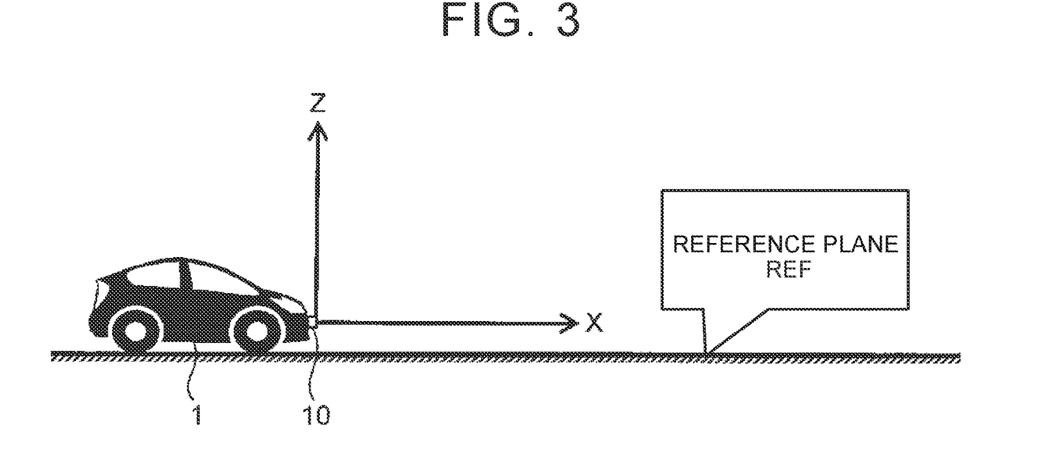
FIG. 3 is a schematic diagram for describing a reference state and a reference plane according to the first embodiment of the present disclosure.

In the case where the axial deviation of the LIDAR system 10 does not occur, the estimated road plane ERP coincides with the reference plane REF illustrated in FIG. 3. Meanwhile, in the case where the axial deviation of the LIDAR system 10 occurs, the estimated road plane ERP is deviated from the reference plane REF illustrated in FIG. 3.

Figure 6:
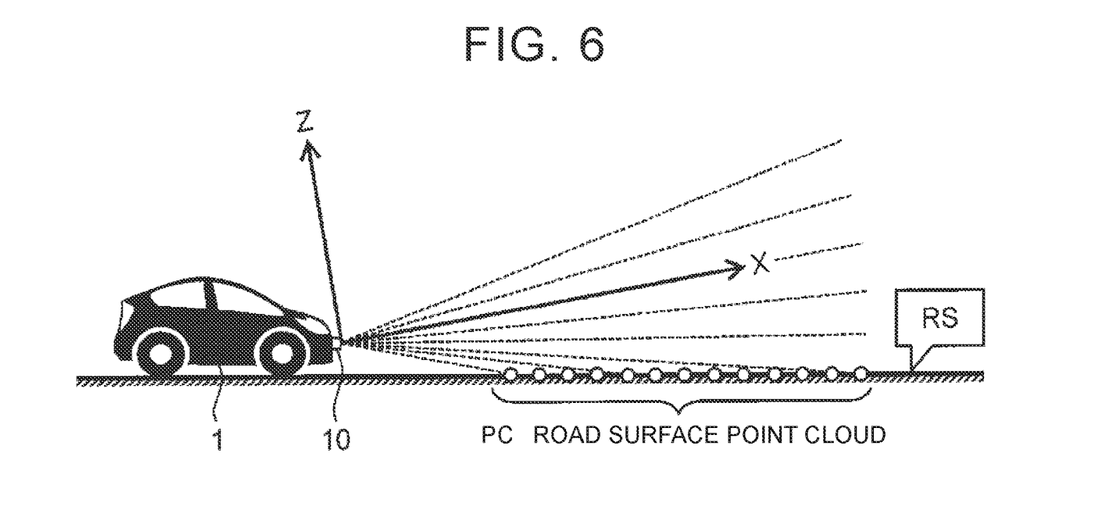
FIG. 6 is a schematic diagram for describing the axial deviation of the LIDAR system according to the first embodiment of the present disclosure.

FIG. 6 illustrates a state in which the axial deviation of the LIDAR system 10 occurs. In the case where the axial deviation occurs, the sensor coordinate system is varied from the sensor coordinate system in the reference state. Accordingly, the "apparent position" of the road surface point cloud PC in the sensor coordinate system after the sensor coordinate system is varied is deviated from the road surface point cloud PC in the sensor coordinate system in the reference state. The position of the road surface point cloud PC in the sensor coordinate system in the reference state is represented by the reference plane REF described above. Thus, in the case where the axial deviation of the LIDAR system 10 occurs, the estimated road plane ERP is deviated from the reference plane REF. Conversely, whether the axial deviation of the LIDAR system 10 occurs can be determined by comparing the estimated road plane ERP with the reference plane REF.

Figure 7:
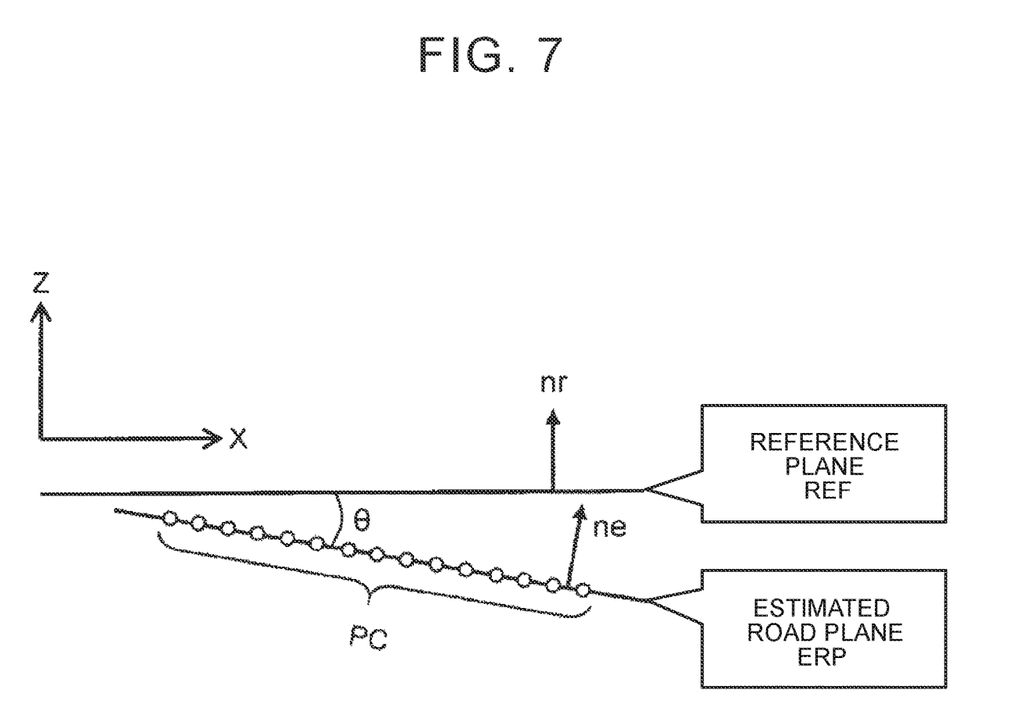
FIG. 7 is a schematic diagram for describing axial deviation determination processing according to the first embodiment of the present disclosure.

FIG. 7 is a schematic diagram for describing "axial deviation determination processing" according to the embodiment. The reference plane REF and the estimated road plane ERP in the sensor coordinate system are illustrated in FIG. 7. In the case where the "deviation" between the estimated road plane ERP and the reference plane REF is larger than a threshold, it is determined that the axial deviation of the LIDAR system 10 occurs. For example, the "deviation" between the estimated road plane ERP and the reference plane REF can be represented by an angle $\theta$. The angle $\theta$ is an angle defined by the normal vector ne to the estimated road plane ERP and the normal vector nr to the reference plane REF. In the case where the angle $\theta$ is larger than the threshold, it is determined that the axial deviation of the LIDAR system 10 occurs. The angle θ corresponds to the amount of the axial deviation.

As described above, according to the embodiment, the estimated road plane ERP is acquired from the road surface point cloud PC detected by the LIDAR system 10. The acquired estimated road plane ERP is compared with the reference plane REF in the reference state in which the axial deviation of the LIDAR system 10 does not occur. In the case where the deviation between the estimated road plane ERP and the reference plane REF is larger than the threshold, it is determined that the axial deviation of the LIDAR system 10 occurs.

The axial deviation of the LIDAR system 10 can thus be detected based on measurement results of the LIDAR system 10. There is no need to use a plurality of types of sensors to detect the axial deviation. In addition, this enables detection of an absolute axial deviation of the LIDAR system 10, rather than a relative axial deviation between each type of sensor. Furthermore, neither special devices nor special facilities are required to detect the axial deviation of the LIDAR system 10. The axial deviation of the LIDAR system 10 can be detected easily and quickly while the vehicle 1 is actually in use.

The technology of detecting the axial deviation according to the embodiment will be described below in further detail.

1-2. Axial Deviation Detection Device

Figure 8:
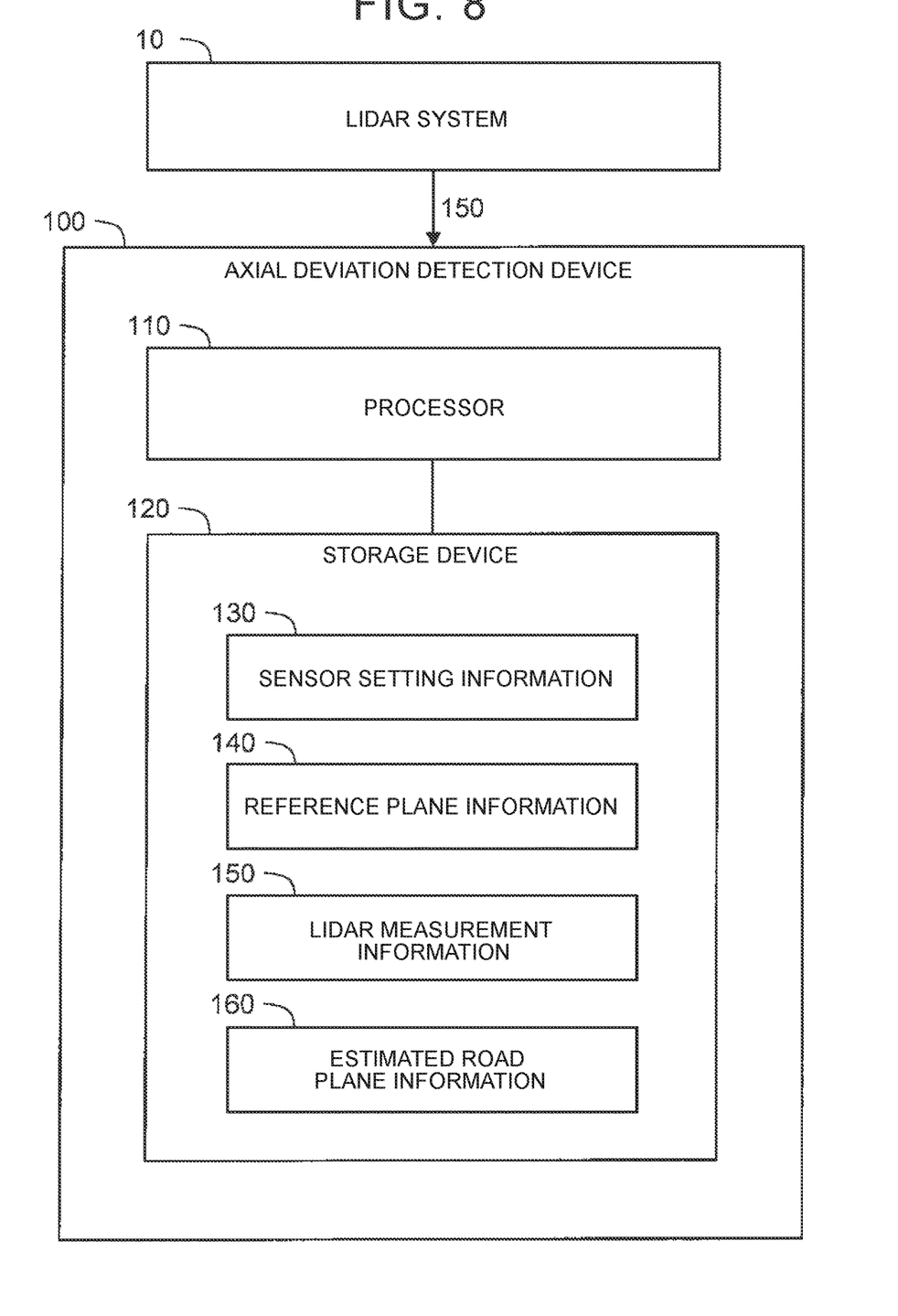
FIG. 8 is a block diagram showing an example of a configuration of an axial deviation detection device according to the first embodiment of the present disclosure.

FIG. 8 is a block diagram showing an example of a configuration of an axial deviation detection device 100 according to the embodiment. The axial deviation detection device 100 detects the axial deviation of the LIDAR system 10 based on the measurement results from the LIDAR system 10. Generally, the axial deviation detection device 100 is mounted on the vehicle 1 together with the LIDAR system 10. Note that the axial deviation detection device 100 does not necessarily have to be mounted on the vehicle 1. As long as the axial deviation detection device 100 can receive the measurement results from the LIDAR system 10, processing by the axial deviation detection device 100 can be achieved.

As shown in FIG. 8, the axial deviation detection device 100 is provided with a processor 110 and a storage device 120. The storage device 120 stores various pieces of information. For example, the storage device 120 stores pieces of information such as sensor setting information 130, reference plane information 140, LIDAR measurement information 150, and estimated road plane information 160.

The sensor setting information 130 indicates the posture (roll, pitch, and yaw) and the height from the ground of the LIDAR system 10 in the initial state in which the LIDAR system 10 is mounted on the vehicle 1. The sensor setting information 130 is stored in the storage device 120 in advance.

The reference plane information 140 indicates the position of the reference plane REF in the sensor coordinate system in the reference state (see FIG. 3).

The LIDAR measurement information 150 indicates the position of the point cloud detected by the LIDAR system 10 in the sensor coordinate system (see FIG. 4).

Figure 5:
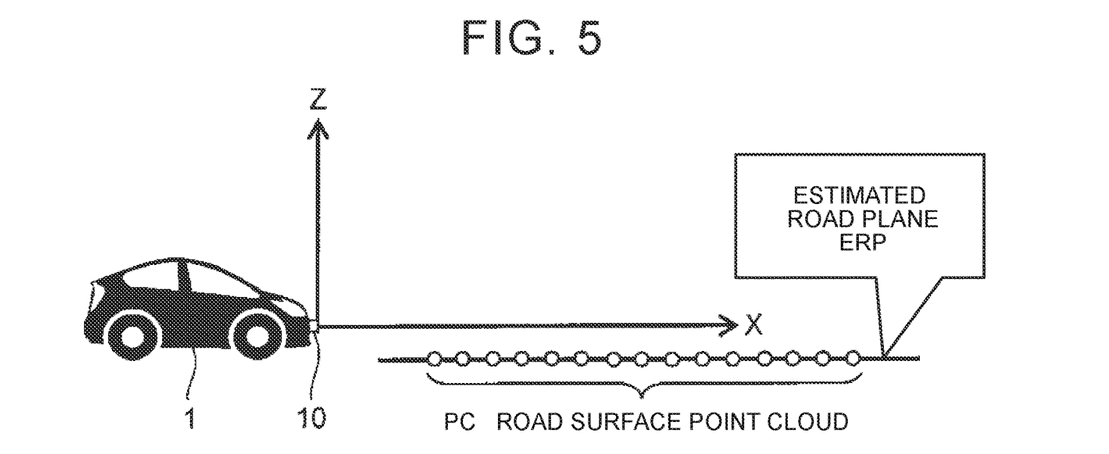
FIG. 5 is a schematic diagram for describing an estimated road plane according to the first embodiment of the present disclosure.

The estimated road plane information 160 indicates the position of the estimated road plane ERP in the sensor coordinate system (See FIG. 5).

The processor 110 executes various processing by executing computer programs. For example, the processor 110 acquires various pieces of information and stores the acquired information in the storage device 120. The processor 110 also reads the information stored in the storage device 120 and executes various processing. For example, the processor 110 executes "axial deviation determination processing" which determines whether the axial deviation of the LIDAR system 10 occurs. Acquisition of the reference plane information 140 and the axial deviation determination processing is described below.

1-3. Acquisition of Reference Plane Information

The processor 110 acquires the reference plane information 140 based, for example, on the assumption that the vehicle 1 is located on an imaginary plane in the reference state. The posture of the LIDAR system 10 and the height of the LIDAR system 10 from the imaginary plane in the reference state (initial state) are acquired from the sensor setting information 130. Thus, the processor 110 may calculate the position of the imaginary plane in the sensor coordinate system based on the sensor setting information 130. The position of the imaginary plane in the sensor coordinate system corresponds to the position of the reference plane REF.

As another example, the processor 110 may calculate the position of the reference plane REF based on the LIDAR measurement information 150. Specifically, the vehicle 1 is positioned on the actual plane in the reference state in which the axial deviation of the LIDAR system 10 does not occur. The LIDAR system 10 is activated in this condition. The processor 110 receives the LIDAR measurement information 150 to extract the road surface point cloud PC representing the actual plane from the point clouds indicated in the LIDAR measurement information 150. Then, the processor 110 approximates the road surface point cloud PC by an approximation plane. The position of the approximation plane in the sensor coordinate system corresponds to the position of the reference plane REF.

The processor 110 acquires the reference plane information 140 in advance, and stores the acquired reference plane information 140 in the storage device 120. The reference plane information 140 is used in the axial deviation determination processing described below.

1-4. Axial Deviation Determination Processing

Figure 9:
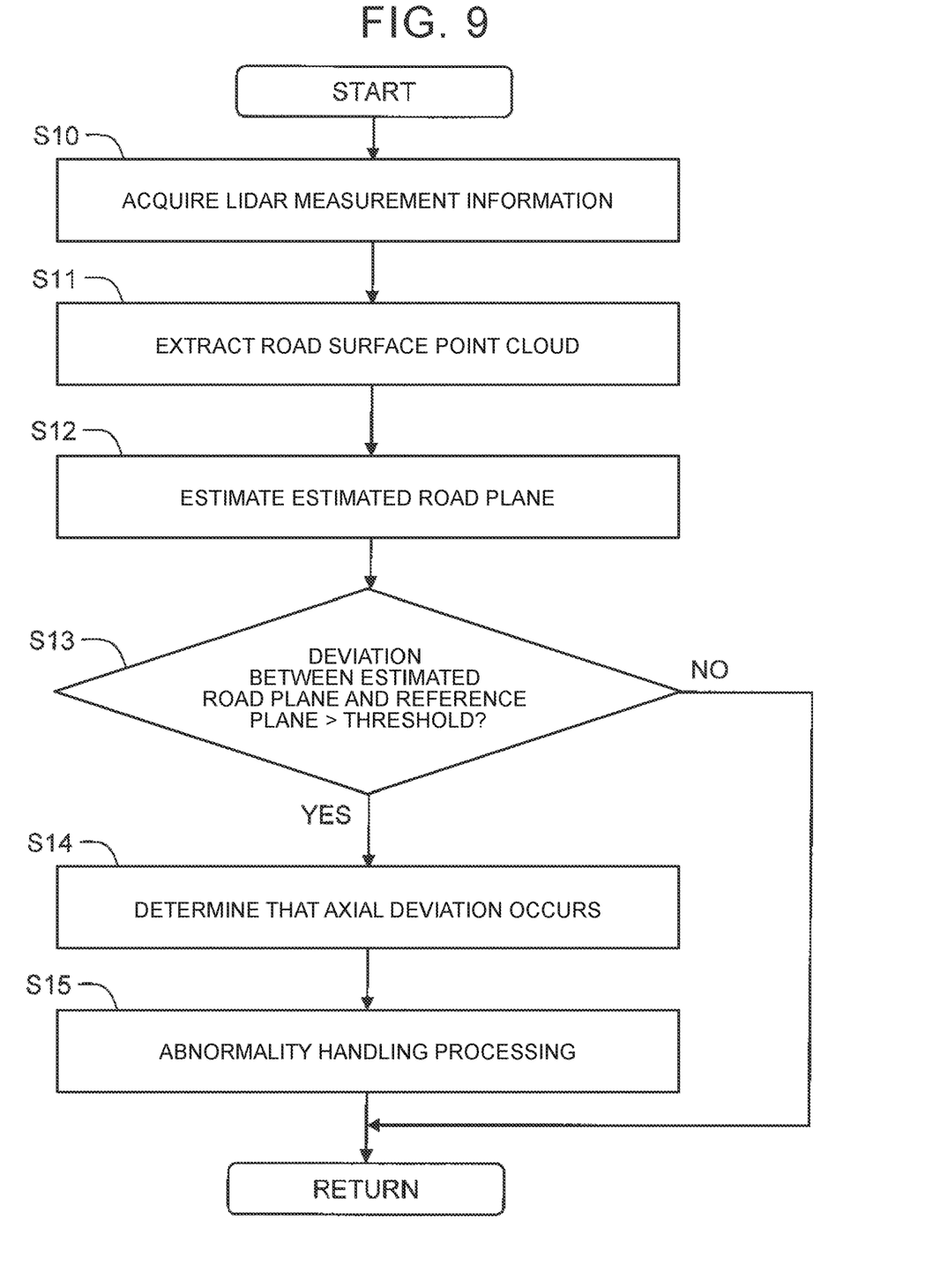
FIG. 9 is a flowchart showing the axial deviation determination processing according to the first embodiment of the present disclosure.

FIG. 9 is a flowchart showing the axial deviation determination processing according to the embodiment. The processing flow shown in FIG. 9 is repeatedly executed for each constant cycle.

In step S10, the LIDAR system 10 is activated. The processor 110 acquires the LIDAR measurement information 150 from the LIDAR system 10. The processor 110 stores the LIDAR measurement information 150 in the storage device 120.

Subsequently, in step S11, the processor 110 extracts the road surface point cloud PC representing the road surface RS from the point clouds indicated in the LIDAR measurement information 150 (see FIG. 4). A method of extracting the road surface point cloud PC from the point clouds is widely known.

Subsequently, in step S12, the processor 110 estimates the estimated road plane ERP. Specifically, the processor 110 approximates the road surface point cloud PC extracted in step S11 by the approximation plane, and acquires the approximation plane as the estimated road plane ERP (see FIG. 5). The processor 110 creates the estimated road plane information 160 representing the position of the estimated road plane ERP in the sensor coordinate system, and stores the created estimated road plane information 160 in the storage device 120.

Subsequently, in step S13, the processor 110 compares the estimated road plane ERP represented in the estimated road plane information 160 with the reference plane REF represented in the reference plane information 140. The processor 110 determines whether the deviation between the estimated road plane ERP and the reference plane REF is larger than the threshold.

For example, the deviation between the estimated road plane ERP and the reference plane REF is represented by the angle θ as illustrated in FIG. 7. The angle θ is the angle defined by the normal vector ne to the estimated road plane ERP and the normal vector nr to the reference plane REF. The processor 110 calculates the normal vectors ne, nr, and the angle θ based on the estimated road plane information 160 and the reference plane information 140. The processor 110 determines whether the angle θ is larger than a predetermined angle threshold.

In the case where the deviation between the estimated road plane ERP and the reference plane REF is not larger than the threshold (step S13: NO), the processor 110 determines that the axial deviation of the LIDAR system 10 does not occur. In this case, the processing in this cycle is terminated.

Meanwhile, in the case where the deviation between the estimated road plane ERP and the reference plane REF is larger than the threshold (step S13: YES), the processor 110 determines that the axial deviation of the LIDAR system 10 occurs (step S14). The processor 110 also determines the angle θ as the axial deviation amount of the LIDAR system 10.

Further, the processor 110 may execute an abnormality handling processing (step S15). For example, the processor 110 notifies a driver of the vehicle 1 that the axial deviation of the LIDAR system 10 has occurred. The processor 110 may also stop identification processing based on the measurement results of the LIDAR system 10.

According to the embodiment, the processor 110 thus executes the axial deviation determination processing based on the reference plane information 140 and the LIDAR measurement information 150 to detect the axial deviation of the LIDAR system 10. There is no need to use a plurality of types of sensors to detect the axial deviation. In addition, this enables detection of an absolute axial deviation of the LIDAR system 10, rather than a relative axial deviation between each type of sensor. Furthermore, neither special devices nor special facilities are required to detect the axial deviation of the LIDAR system 10. The axial deviation of the LIDAR system 10 can be detected easily and quickly while the vehicle 1 is actually in use.

1-5. Driving Assist Control

The axial deviation detection device 100 according to the embodiment may be applied to "driving assist control" that assists the driver in driving the vehicle 1. Examples of the driving assist control include following travel control and collision avoidance control.

The following travel control allows a vehicle to follow a preceding vehicle while maintaining a preset distance from the preceding vehicle. In the case where the distance from the preceding vehicle falls below the preset value, the control device is automatically activated to decelerate the vehicle 1.

The collision avoidance control allows a vehicle to avoid collision with obstacles (other vehicles, bicycles, pedestrians, etc.) on the course ahead of the vehicle. Upon determining that collision with the obstacle(s) is highly probable, the collision avoidance control automatically activates a braking device and/or a steering device to avoid collision.

In either case of the following travel control or the collision avoidance control, the obstacle(s) and the preceding vehicle(s) ahead of the vehicle 1 need to be identified as a target. However, as described with reference to FIG. 2, in the case where the axial deviation of the LIDAR system 10 occurs, the upper structure 3 may be incorrectly identified as a target ahead of the vehicle 1. In the case where the upper structure 3 is incorrectly identified as an obstacle or a preceding vehicle, the vehicle 1 may be decelerated unnecessarily. Unnecessary deceleration (incorrect deceleration) may cause discomfort and anxiety to the driver, and thus may decrease reliability for the driving assist control. Therefore, it is preferable to determine whether the axial deviation of the LIDAR system 10 occurs when executing the driving assist control.

Figure 10:
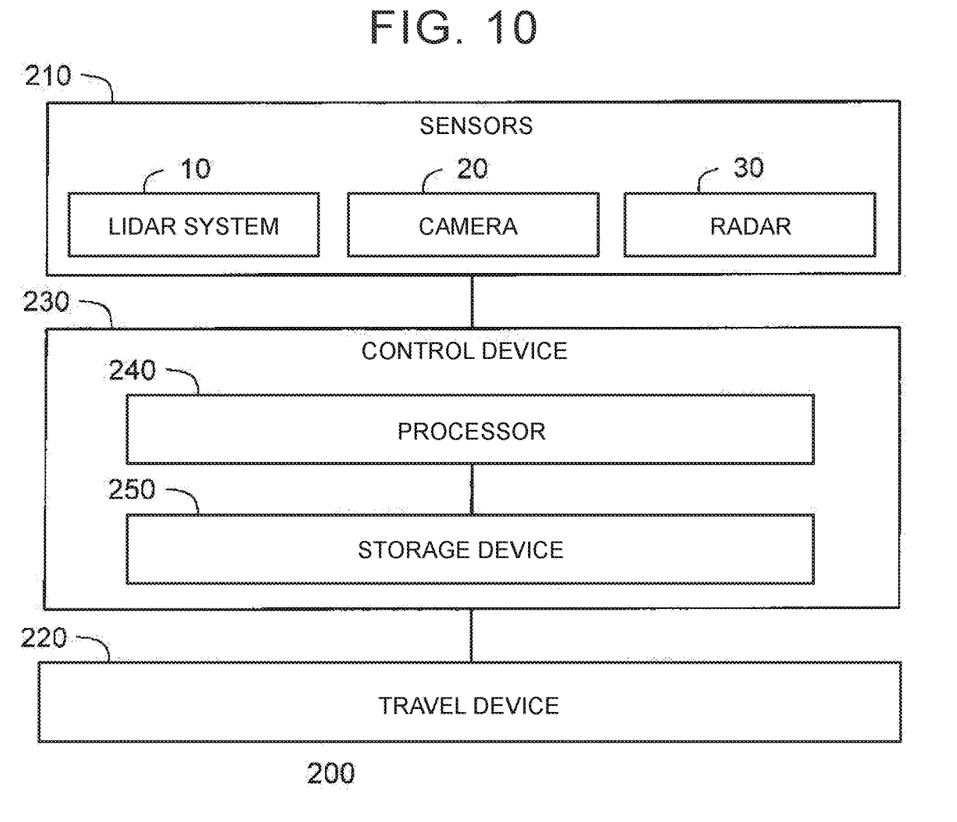
FIG. 10 is a block diagram showing an example of a configuration of a driving assist system according to the first embodiment of the present disclosure.

FIG. 10 is a block diagram showing an example of a configuration of a driving assist system 200 according to the embodiment. The driving assist system 200 is mounted on the vehicle 1 and executes driving assist control that assists the driver in driving the vehicle 1. The driving assist system 200 is provided with sensors 210, a travel device 220, and a control device 230.

The sensors 210 detect conditions around the vehicle 1. For example, the sensors 210 include the LIDAR system 10, a camera 20, and a radar 30. Information indicating the detection results from the sensors 210 is transmitted to the control device 230.

The travel device 220 includes a driving device, a braking device, and a steering device. The driving device is a power source that generates driving force. Examples of the driving device include an engine, an electric motor, and an in-wheel motor. The braking device generates braking force. The steering device steers the wheels of the vehicle 1. For example, the steering device includes an electric power steering (EPS) device.

The control device 230 is a microcomputer that is provided with a processor 240 and a storage device 250. The control device 230 is also referred to as an electronic control unit (ECU). A control program is stored in the storage device 250. The processor 240 executes the control program stored in the storage device 250, so that various processing are achieved by the control device 230.

For example, the control device 230 controls operations of the travel device 220 to execute vehicle travel control. The vehicle travel control includes driving control, braking control, and steering control. The driving control is executed via the driving device. The braking control is executed via the braking device. The steering control is executed via the steering device.

The control device 230 executes driving assist control. More specifically, the control device 230 executes identification processing that identifies the conditions around the vehicle 1 based on the detection result information transmitted from the sensors 210. The control device 230 executes the vehicle travel control described above based on the identification results of the conditions, thereby executing driving assist control (following travel control, collision avoidance control).

Furthermore, the control device 230 also serves as the axial deviation detection device 100 according to the embodiment. That is, the control device 230 includes the processor 110 and the storage device 120 shown in FIG. 8. The processor 110 and the processor 240 may be the shared, and may be separated. The storage device 120 and the storage device 250 may be shared, and may be separated. The control device 230 executes the axial deviation determination processing shown in FIG. 9.

In the case where it is determined that the axial deviation of the LIDAR system 10 occurs, the control device 230 executes the abnormality handling processing (step S15). For example, the control device 230 notifies the driver that the axial deviation of the LIDAR system 10 has occurred. The control device 230 may continue executing the driving assist control using other sensors instead of using the LIDAR system 10 with which the axial deviation has occurred. That is, the control device 230 may continue executing the driving assist control in a degenerated state. In the case where a plurality of LIDAR systems 10 is mounted on the vehicle 1, a normal LIDAR system 10 is used while excluding the LIDAR system 10 with which the axial deviation has occurred.

Thus, the driving assist system 200 according to the embodiment also serves as the axial deviation detection device 100, and can detect the axial deviation of the LIDAR system 10. In the case where the axial deviation of the LIDAR system 10 is detected, the LIDAR system 10 is not used in the driving assist control. This can suppress incorrect identification described with reference to FIG. 2, for example. As a result, unnecessary deceleration can be suppressed, thereby mitigating the driver's discomfort and anxiety. This contributes to enhancement in reliability for the driving assist control.

2. Second Embodiment

Figure 11:
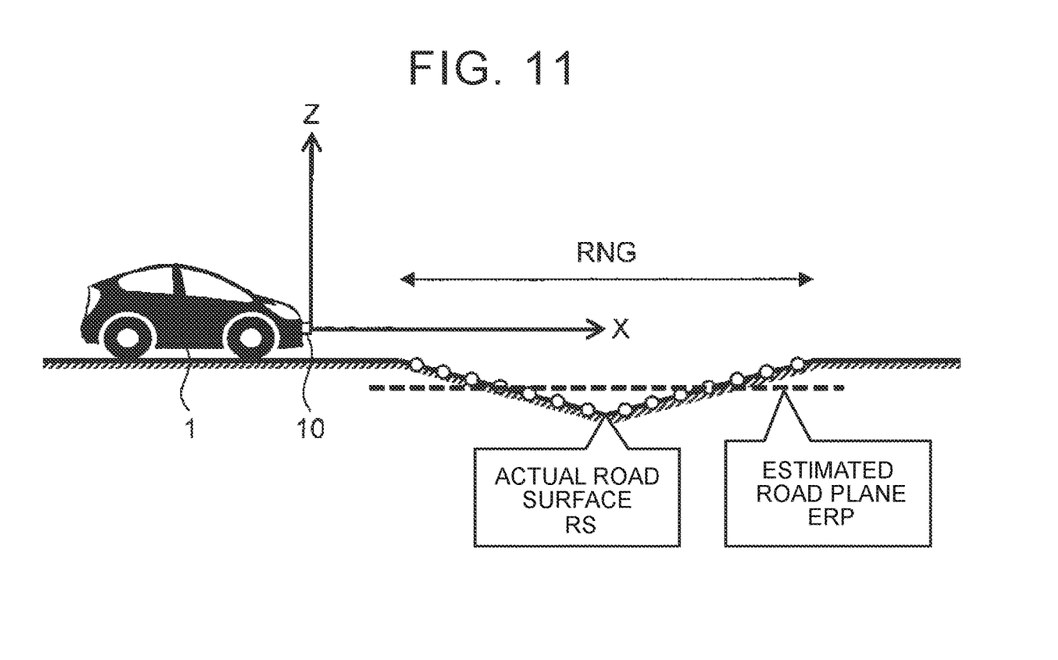
FIG. 11 is a schematic diagram for describing a second embodiment of the present disclosure.

FIG. 11 is a schematic diagram for describing a second embodiment. The estimated road plane ERP estimated based on the road surface point cloud PC does not necessarily coincide with the actual road surface RS. For example, in FIG. 11, the road surface RS within a measurement range RNG of the LIDAR system 10 has a bumpy shape rather than a flat shape. In this case, the shape of the estimated road plane ERP estimated based on the road surface point cloud PC deviates from the shape of the actual road surface RS. As the deviation between the estimated road plane ERP and the actual road surface RS increases, the accuracy in the axial deviation determination processing decreases.

In this view, according to the second embodiment, "reliability" of the estimated road plane ERP is taken into account in order to secure a constant level of accuracy in the axial deviation determination processing. In a state where the reliability of the estimated road plane ERP is low, the determination on whether the axial deviation of the LIDAR system 10 occurs is reserved.

Figure 12:
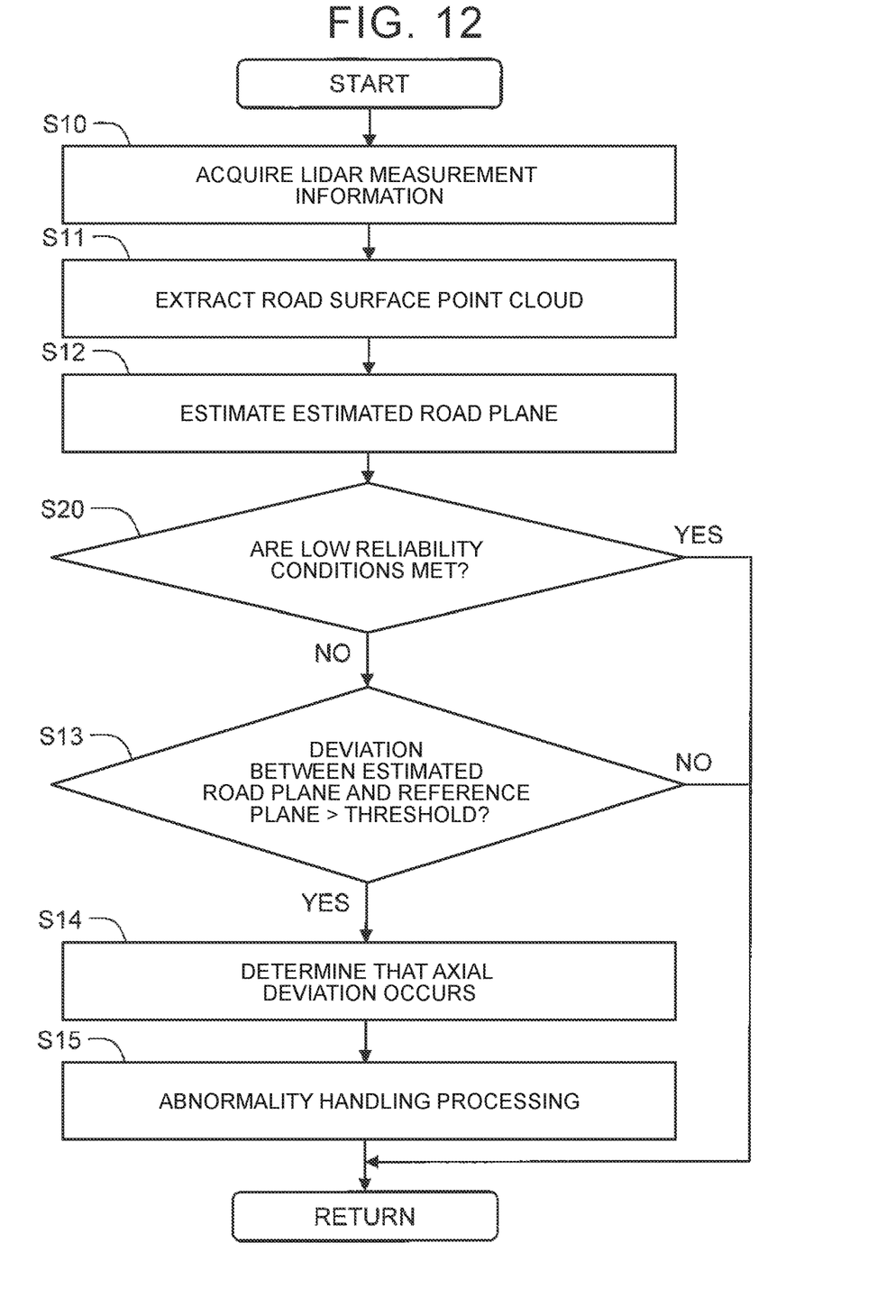
FIG. 12 is a flowchart showing the axial deviation determination processing according to the second embodiment of the present disclosure.

FIG. 12 is a flowchart showing the axial deviation determination processing according to the second embodiment. Repetitive description that has been described in the first embodiment is omitted in the second embodiment. As shown in FIG. 12, step S20 is added between step S12 and step S13.

In step S20, the processor 110 determines whether low reliability conditions are met. The low reliability conditions are conditions indicating that the reliability of the estimated road plane ERP acquired in step S12 is low. Various examples can be considered as the low reliability conditions.

A first example of the low reliability conditions is a state in which a residual between the road surface point cloud PC and the estimated road plane ERP is larger than a predetermined first threshold. As described above, the processor 110 approximates the road surface point cloud PC by the approximation plane, and acquires the approximation plane as the estimated road plane ERP. A large residual in the approximation processing (fitting processing) means that the deviation between the estimated road plane ERP and the actual road surface RS is large (see FIG. 11). Thus, it can be determined whether the reliability of the estimated road plane ERP is high or low based on the residual.

Figure 13:
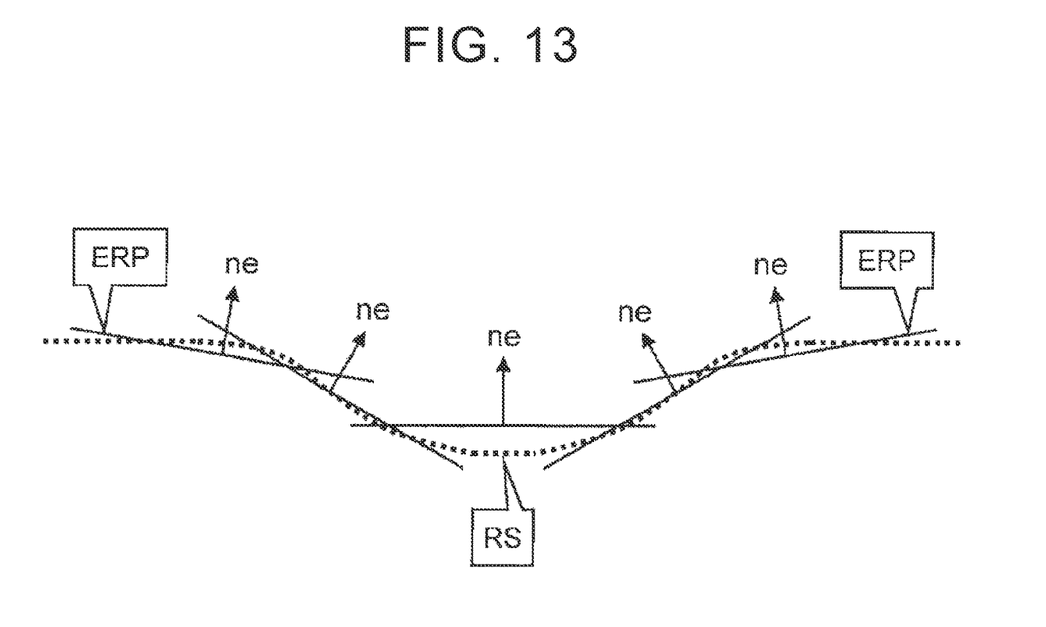
FIG. 13 is a schematic diagram for describing an example of low reliability conditions on an estimated road plane according to the second embodiment of the present disclosure.

A second example of the low reliability conditions is a state in which a variation of the normal vector ne to the estimated road plane ERP within a certain period is larger than a predetermined second threshold. FIG. 13 is a schematic diagram for describing the second example of the low reliability conditions. More specifically, FIG. 13 shows the change of the normal vector ne to the estimated road plane ERP over time as the vehicle 1 passes through the bumpy road surface RS. As shown in FIG. 13, the normal vector ne unstably changes over time. The same applies when the vehicle 1 approaches a slope or runs on a rough road. Thus, whether the reliability of the estimated road plane ERP is high or low can be determined based on the variation of the normal vector ne within a certain period.

In the case where three-dimensional map information is available, the processor 110 may refer to the three-dimensional map information and identify the shape of the road surface RS around the vehicle 1. It can be considered that the reliability of the estimated road plane ERP decreases as a degree of flatness of the road surface RS within the measurement range RNG of the LIDAR system 10 decreases.

In the case where the low reliability conditions are not met (step S20: NO), the reliability of the estimated road plane ERP is high. In this case, the process proceeds to step S13. The processor 110 determines whether the axial deviation of the LIDAR system 10 occurs based on the estimated road plane information 160 and the reference plane information 140.

Meanwhile, in the case where the low reliability conditions are met (step S20: YES), the reliability of the estimated road plane ERP is low. In this case, the process does not proceed to step S13 and the process in this cycle is terminated. In other words, the processor 110 reserves determination on whether the axial deviation of the LIDAR system 10 occurs.

As described above, according to the second embodiment, the reliability of the estimated road plane ERP is taken into account in the axial deviation determination processing. In the case where the reliability of the estimated road plane ERP is low, the determination on whether the axial deviation of the LIDAR system 10 occurs is reserved. Thus, a constant level of accuracy in the axial deviation determination processing is secured.

3. Third Embodiment

In the first embodiment, the estimated road plane ERP is calculated to be used in the axial deviation determination processing. In a third embodiment, an axial deviation determination processing that does not use the estimated road plane ERP is described. Repetitive description that has been described in the first embodiment is omitted in the third embodiment.

Figure 14:
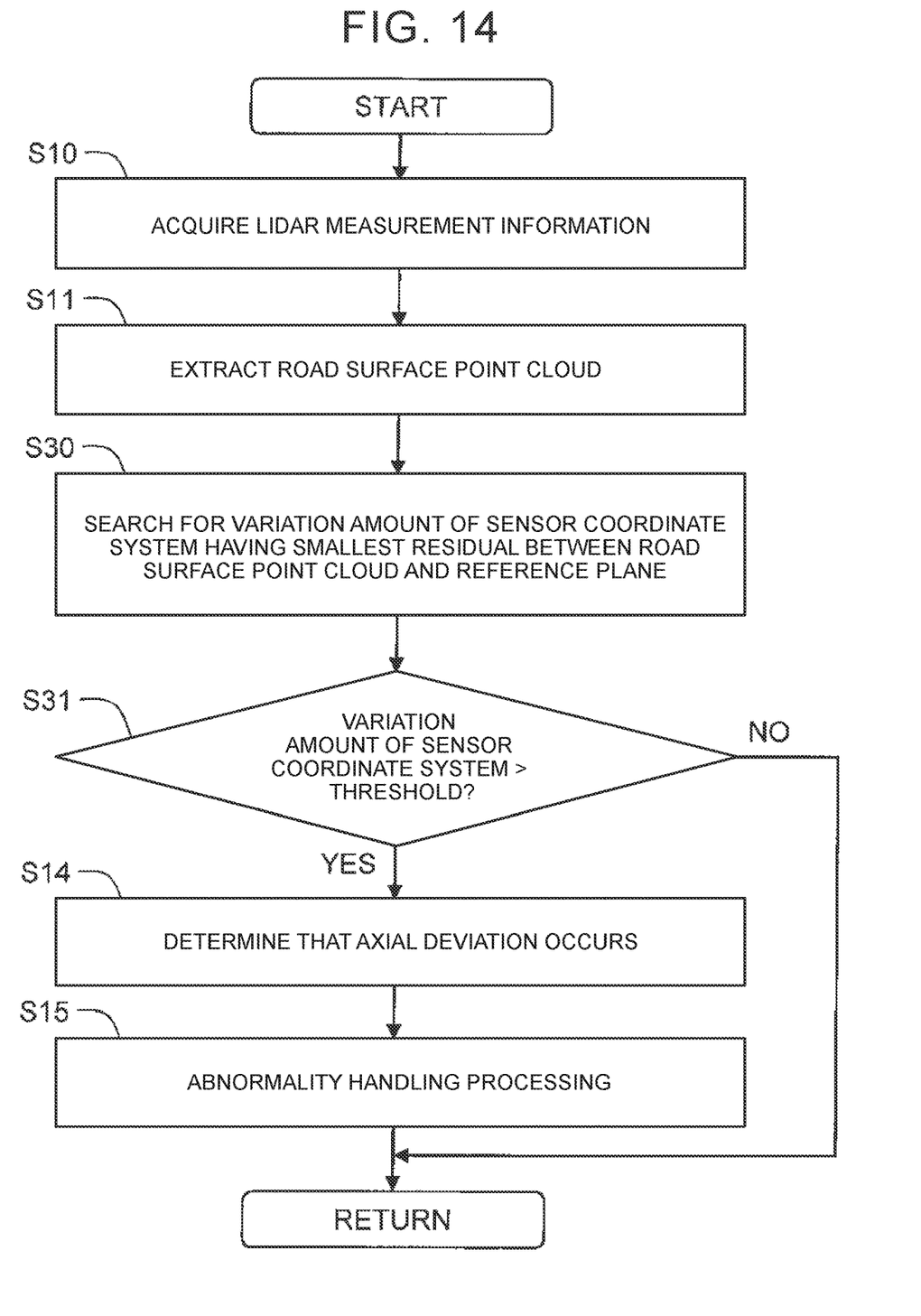
FIG. 14 is a flowchart showing the axial deviation determination processing according to a third embodiment of the present disclosure.

FIG. 14 is a flowchart showing the axial deviation determination processing according to the third embodiment. Steps S10 and S11 are the same as those in the first embodiment (see FIG. 9). After step S11, the process proceeds to step S30.

In step S30, the processor 110 calculates the residual between the road surface point cloud PC and the reference plane REF indicated in the reference plane information 140. At this time, the processor 110 calculates the residual while varying the sensor coordinate system to search for a variation amount of the sensor coordinate system having the smallest residual. For example, the processor 110 varies the sensor coordinate system with respect to the road surface point cloud PC to execute coordinate transformation of the road surface point cloud PC. In this case, the processor 110 calculates the residual between the road surface point cloud PC after the coordinate transformation and the reference plane REF. Instead, the processor 110 may vary the sensor coordinate system with respect to the reference plane REF to execute coordinate transformation of the reference plane REF. In this case, the processor 110 calculates the residual between the road surface point cloud PC and the reference plane REF after the coordinate transformation.

Subsequently, in step S31, the processor 110 compares the variation amount of the sensor coordinate system having the smallest residual with a threshold. In other words, the processor 110 determines whether the variation amount of the sensor coordinate system having the smallest residual is larger than the threshold.

In the case where the variation amount of the sensor coordinate system is not larger than the threshold (step S31: NO), the processor 110 determines that the axial deviation of the LIDAR system 10 does not occur. In this case, the process in this cycle is terminated.

Meanwhile, in the case where the variation amount of the sensor coordinate system is larger than the threshold (step S31: YES), the processor 110 determines that the axial deviation of the LIDAR system 10 occurs (step S14). The processor 110 also determines the variation amount of the sensor coordinate system as the axial deviation amount of the LIDAR system 10.

A method related to the third embodiment described above is equivalent to the method related to the first embodiment. According to the third embodiment, an effect similar to that according to the first embodiment can be obtained.

4. Fourth Embodiment

In a fourth embodiment, reliability is also taken into account in addition to the third embodiment described above. The reason that the reliability is taken into account is already described in the second embodiment.

Figure 15:
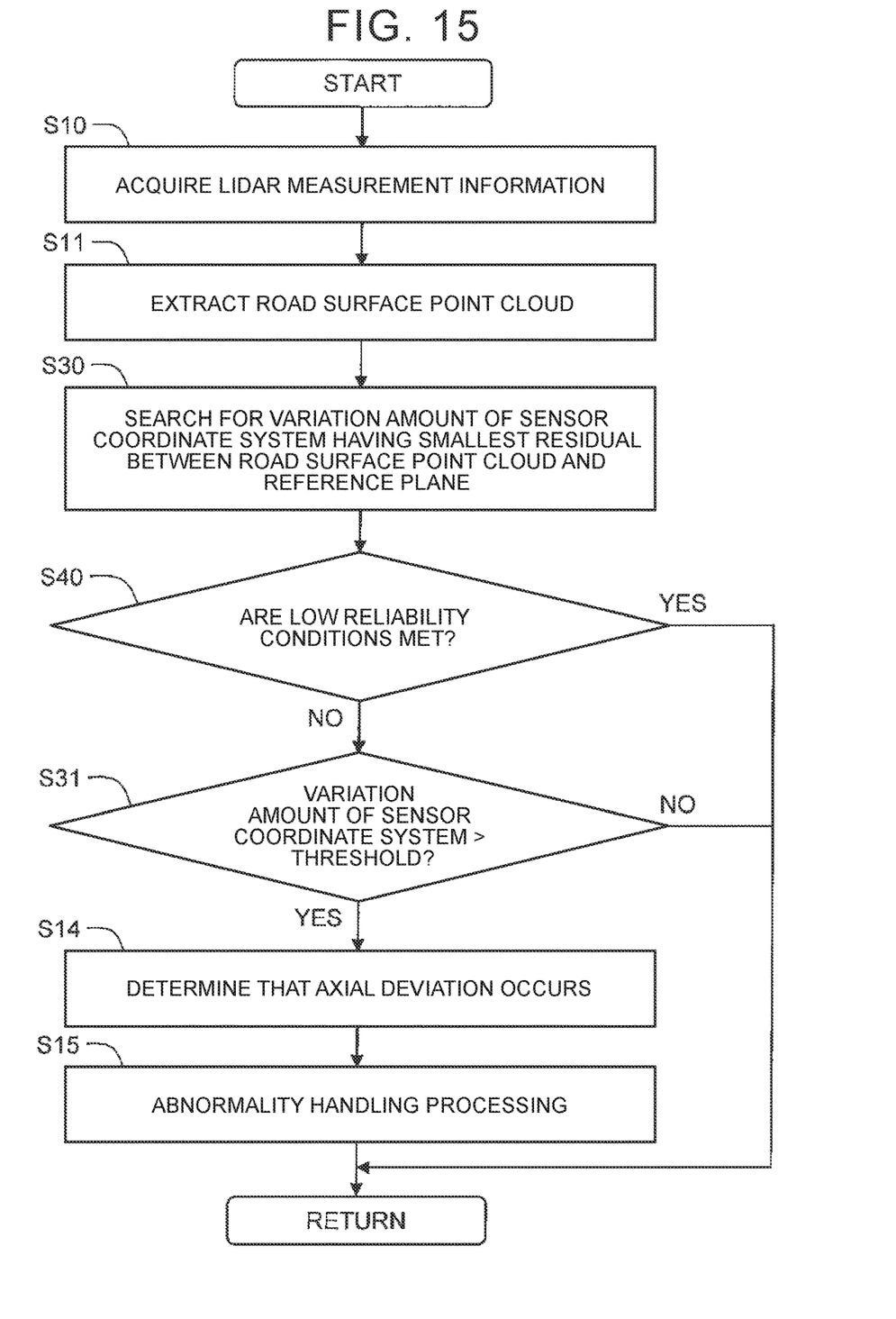
FIG. 15 is a flowchart showing the axial deviation determination processing according to a fourth embodiment of the present disclosure.

FIG. 15 is a flowchart showing the axial deviation determination processing according to the fourth embodiment. Repetitive description that has been described in the third embodiment is omitted in the fourth embodiment. As shown in FIG. 15, step S40 is added between step S30 and step S31.

In step S40, the processor 110 determines whether low reliability conditions are met. One example of the low reliability conditions is a state in which the "smallest residual" calculated in step S30 is larger than a predetermined third threshold. A large "smallest residual" calculated in step S30 is equivalent to low reliability of the estimated road plane ERP estimated based on the road surface point cloud PC.

As another example, the processor 110 may calculate the estimated road plane ERP to apply the low reliability conditions related to the estimated road plane ERP described in the second embodiment.

In the case where the low reliability conditions are not met (step S40: NO), the process proceeds to step S31. The processor 110 determines whether the axial deviation of the LIDAR system 10 occurs.

Meanwhile, in the case where the low reliability conditions are met (step S40: YES), the process does not proceed to step S31 and the process in this cycle is terminated. That is, the processor 110 reserves determination on whether the axial deviation of the LIDAR system 10 occurs. Thus, a constant level of accuracy in the axial deviation determination processing is secured.

What is claimed is:

1. An axial deviation detection device configured to detect an axial deviation of a laser imaging detection and ranging, LIDAR, system mounted on a vehicle, the axial deviation detection device comprising:
   a storage device configured to store reference plane information indicating a position of a reference plane, and LIDAR measurement information indicating positions of point clouds detected by the LIDAR system in a sensor coordinate system, the sensor coordinate system being a varied coordinate system that varies in accordance with the axial deviation of the LIDAR system, and the reference plane corresponding to a plane represented in the sensor coordinate system in a state in which the axial deviation of the LIDAR system does not occur and the vehicle is located on the plane; and
   a processor configured to
      extract a road surface point cloud representing a road surface from the point clouds indicated in the LIDAR measurement information,
      approximate the road surface point cloud by an approximation plane and acquire the approximation plane as an estimated road plane,
      compare a normal vector of the estimated road plane with a normal vector of the reference plane indicated by the reference plane information, and
      determine that the axial deviation occurs in a case where a deviation between the normal vector of the estimated road plane and the normal vector of the reference plane is larger than a threshold,
   wherein the processor is configured to reserve determination on whether the axial deviation occurs in a case where a low reliability condition indicating that reliability of the estimated road plane is low is met.

2. The axial deviation detection device according to claim 1, wherein a low reliability condition is that a residual between the road surface point cloud and the estimated road plane is larger than a first threshold.

3. The axial deviation detection device according to claim 1, wherein a low reliability condition is that a variation of a normal vector to the estimated road plane within a certain period is larger than a second threshold.

4. A vehicle comprising:
   a laser imaging detection and ranging, LIDAR, system,
   a storage device configured to store reference plane information indicating a position of a reference plane, and LIDAR measurement information indicating positions of point clouds detected by the LIDAR system in a sensor coordinate system, the sensor coordinate system being a varied coordinate system that varies in accordance with an axial deviation of the LIDAR system, and the reference plane corresponding to a plane represented in the sensor coordinate system in a state in which the axial deviation of the LIDAR system does not occur and the vehicle is located on the plane; and
   a processor configured to
      extract a road surface point cloud representing a road surface from the point clouds indicated in the LIDAR measurement information,
      approximate the road surface point cloud by an approximation plane and acquire the approximation plane as an estimated road plane,
      compare a normal vector of the estimated road plane with a normal vector of the reference plane indicated by the reference plane information, and determine that the axial deviation occurs in a case where a deviation between the normal vector of the estimated road plane and the normal vector of the reference plane is larger than a threshold, wherein the processor is configured to reserve determination on whether the axial deviation occurs in a case where a low reliability condition indicating that reliability of the estimated road plane is low is met.

* * * * *